United States Patent
Usui

(10) Patent No.: US 8,416,582 B2
(45) Date of Patent: Apr. 9, 2013

(54) DC-DC CONVERTER

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 302 days.

(21) Appl. No.: 12/781,238

(22) Filed: May 17, 2010

(65) Prior Publication Data

US 2010/0302817 A1 Dec. 2, 2010

(30) Foreign Application Priority Data

May 27, 2009 (JP) .................................. 2009-127586

(51) Int. Cl.
   *H02M 3/335* (2006.01)
(52) U.S. Cl.
   USPC ............................................ 363/16; 363/131
(58) Field of Classification Search ............. 363/16.123, 363/131
   See application file for complete search history.

(56) References Cited

U.S. PATENT DOCUMENTS 6,449,172 B2 * 9/2002 Nagahara ..................... 363/25
2008/0284390 A1 11/2008 Usui

FOREIGN PATENT DOCUMENTS

| JP | 63-136969 | 6/1988 |
| JP | 11-55939 | 2/1999 |
| JP | 2000-32750 | 1/2000 |
| JP | 2005-39975 | 2/2005 |

OTHER PUBLICATIONS

U.S. Appl. No. 12/824,590, filed Jun. 28, 2010, Usui.
Office Action issued Apr. 26, 2011 in Japanese Patent Application No. 2009-127586.
U.S. Appl. No. 13/304,919, filed Nov. 28, 2011, Usui.

* cited by examiner

*Primary Examiner* — Shawn Riley
(74) *Attorney, Agent, or Firm* — Oblon, Spivak, McClelland, Maier & Neustadt, L.L.P.

(57) ABSTRACT

A DC-DC converter includes a plurality of switch elements connected in series between both ends of a DC power source, a series circuit of a primary winding of a transformer and a capacitor, connected between a connection point of the plurality of switch elements and an end of the DC power source, a rectifying-smoothing circuit to rectify and smooth a voltage generated by a secondary winding of the transformer into a DC voltage, and a controller to change a switching frequency of the plurality of switch elements according to a feedback signal generated from the DC voltage and alternately turn on/off the plurality of switch elements. The controller includes a nonlinear response unit 11a to nonlinearly change the switching frequency according to a feedback amount represented by the feedback signal.

4 Claims, 9 Drawing Sheets

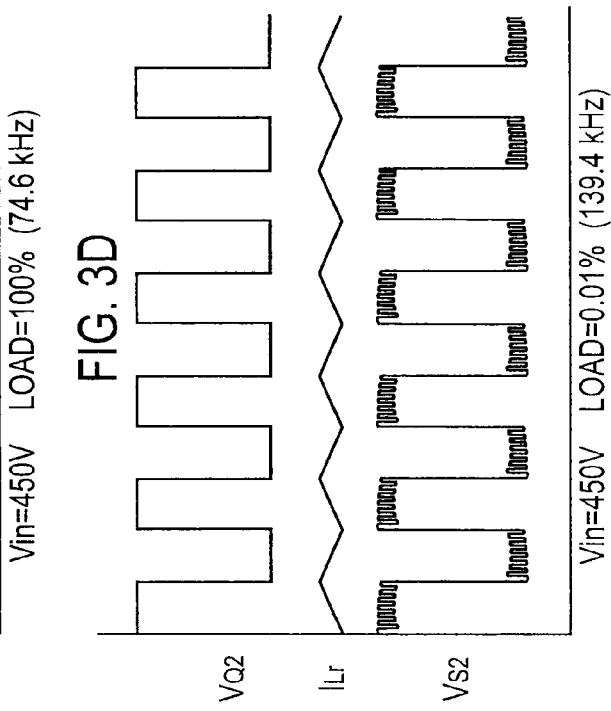

DC-DC CONVERTER

BACKGROUND OF THE INVENTION

1. Field of the Invention

The present invention relates to a DC-DC converter, and particularly, to feedback control of the DC-DC converter.

2. Description of the Related Art

FIG. 1 is a circuit diagram illustrating a DC-DC converter according to a related art. Operation of the DC-DC converter of FIG. 1 will be explained. A DC power source Vin applies a voltage to a starter (not illustrated) to start a controller 10. The controller 10 has an oscillator 11, a D-flip-flop 13, dead time generators 14 and 15, a level shifter 16, and buffers 17 and 18, to alternately turn on/off switch elements Q1 and Q2 with a dead time included.

When the switch element Q2 is turned on, a current passes clockwise through a path extending along Vin, Q2, Lr, P, Cri, and Vin. This current is a resultant current of an excitation current passing through an excitation inductance Lp on the primary side of a transformer T and a load current supplied through a primary winding P, secondary winding S2, diode D2, and a capacitor Co to output terminals +Vo and −Vo to a load. The excitation current is a sinusoidal resonant current created by an inductive reactance of the reactor Lr and the excitation inductance Lp and a capacitive reactance of the current resonant capacitor Cri. To make the frequency of the sinusoidal resonant current lower than an ON period of the switch element Q2, the sinusoidal wave of the resonant current is partly observed as a triangular wave. The load current is a sinusoidal resonant current created by resonant components of the reactor Lr and current resonant capacitor Cri.

When the switch element Q2 is turned off, energy accumulated in the transformer T by the excitation current causes a quasi-voltage-resonance of the inductive reactance to the reactor Lr and the excitation inductance Lp and the capacitive reactance to the current resonant capacitor Cri and a voltage resonant capacitor Cry. At this time, a resonant frequency by the voltage resonant capacitor Cry of small capacitance is observed as a voltage across the switch elements Q1 and Q2. Namely, a current of the switch element Q2 is switched when the switch element Q2 is turned off to a current passing through the voltage resonant capacitor Crv. When the voltage resonant capacitor Cry is discharged to 0 V level, the current path is switched to a diode D3. Then, the energy accumulated in the transformer T by the excitation current charges the current resonant capacitor Cri through the diode D3. During this period, the switch element Q1 is turned on to realize zero voltage switching of the switch element Q1.

When the switch element Q1 is turned on, the current resonant capacitor Cri serves as a power source to pass a current counterclockwise through a path extending along Cri, P, Lr, Q1, and Cri. This current is a resultant current of an excitation current passing through the excitation inductance Lp of the transformer T and a load current supplied through the primary winding P, secondary winding S1, diode D1, and smoothing capacitor Co to the output terminals +Vo and −Vo to the load. The excitation current is a sinusoidal resonant current created by the reactor Lr, the excitation inductance Lp, and the current resonant capacitor Cri. To make the frequency of the sinusoidal resonant current lower than an ON period of the switch element Q1, the sinusoidal wave of the resonant current is partly observed as a triangular wave. The load current is a sinusoidal resonant current created by resonant components of the reactor Lr and current resonant capacitor Cri.

When the switch element Q1 is turned off, energy accumulated in the transformer T by the excitation current causes a quasi-voltage-resonance of the inductive reactance to the reactor Lr and the excitation inductance Lp and the capacitive reactance to the current resonant capacitor Cri and the voltage resonant capacitor Cry. At this time, a resonant frequency by the voltage resonant capacitor Cry of small capacitance is observed as a voltage across the switch elements Q1 and Q2. Namely, a current of the switch element Q1 is switched when the switch element Q1 is turned off to a current passing through the voltage resonant capacitor Cry. When the voltage resonant capacitor Cry is charged to the voltage of the DC power source Vin, the current path is switched to a diode D4. This means that the energy accumulated in the transformer T by the excitation current is regenerated through the diode D4 to the DC power source Vin. During this period, the switch element Q2 is turned on to realize zero voltage switching of the switch element Q2.

FIG. 2A illustrates waveforms at characteristic parts of the DC-DC converter of FIG. 1 with the DC power source Vin being 300 V, the load being 100% (heavy load), and the switching frequency being 43.1 kHz and FIG. 2B illustrates waveforms at the essential parts with the DC power source Vin being 450 V, the load being 100%, and the switching frequency being 74.6 kHz. By comparing FIGS. 2A and 2B with each other, one can grasp changes that occur at the essential parts when the input voltage varies under heavy load.

In this example, the controller 10 fixes the dead time, and according to the varying input voltage, controls the switching frequency to alternately turn on/off the switch elements Q1 and Q2. On an assumption that the frequency of the resonant current to the load is constant, the controller 10 controls the switching frequency to, for example, widen an ON width and increase the excitation current that is a circulation current, thereby changing the voltage amplitude of the current resonant capacitor Cri and controlling an output voltage.

FIG. 2C illustrates waveforms at the essential parts with the DC power source Vin being 300 V, the load being 0.01% (no load), and the switching frequency being 47.1 kHz and FIG. 2D illustrates waveforms at the essential parts with the DC power source Vin being 450 V, the load being 0.01% (no load), and the switching frequency being 83.3 kHz. By comparing FIGS. 2C and 2D with each other, one can grasp changes that occur at the essential parts when the input voltage varies under no load.

By comparing FIGS. 2A and 2C, or FIGS. 2B and 2D with each other, one can grasp changes that occur at the essential parts when the load varies under the same input voltage. The waveforms of FIG. 2A involve a resonant current corresponding to a load current because of the heavy-load condition. The waveforms of FIG. 2C involve substantially no resonant current corresponding to a load current because of the no-load condition. It is understood from the waveforms of FIGS. 2A and 2C that the switching frequency is substantially unchanged with respect to a load variation.

An actual DC-DC converter involves many inductances and capacitances that are not illustrated in FIG. 1. Generally, they cause no large influence on operation of the DC-DC converter. There is, however, some instance in which the inductances and capacitances are not ignorable. For example, the transformer T of FIG. 1 has an inter-winding stray capacitance Cm indicated with a dotted line in FIG. 1. If the inter-winding stray capacitance Cm is relatively large, it affects operation of the DC-DC converter.

FIGS. 3A to 3D, which correspond to FIGS. 2A to 2D, illustrate waveforms at the characteristic parts of the DC-DC converter including the inter-winding stray capacitance. Unlike the waveforms of FIGS. 2A to 2D, the waveforms of FIGS. 3A to 3D show a large change in the switching frequency when the load varies. This is because the inter-winding stray capacitance Cm and winding inductance create an oscillating voltage and because the peak voltage thereof is peak-charged at the time of rectification.

The peak charging tends to increase a voltage after rectification, and therefore, a feedback circuit (a photocoupler PC) provides a large feedback amount to the controller 10. Due to this, the controller 10 increases the oscillation frequency (corresponding to the switching frequency) of the oscillator 11, to suppress an increase in the output voltage V0. Namely, the feedback amount is small in the range from heavy to light load and is large in the range from light to no load. FIG. 4 illustrates a relationship between an output power ratio and a switching frequency. As is apparent in FIG. 4, the presence of the inter-winding stray capacitance increases the switching frequency as the output power ratio decreases.

FIG. 5 illustrates a relationship between the feedback current and oscillation frequency of the controller 10 of the DC-DC converter according to the related art. As is apparent in FIG. 5, the feedback current and oscillation frequency have a proportional relationship. When the inter-winding stray capacitance is small, there is a little change in the oscillation frequency, so that a small feedback current is sufficient to control the DC-DC converter.

If the inter-winding stray capacitance is large, a change in the oscillation frequency becomes larger to increase the feedback current to control the DC-DC converter. To pass the large feedback current, the photocoupler PC must have a large gain. The DC-DC converter employing the feedback control must have proper phase and gain (feedback gain) values, to stabilize the feedback loop. It is known that a gain of unity or larger and a phase of an integer multiple of 360 degrees cause an abnormal oscillation in a control system. Namely, excessively increasing the gain of the photocoupler PC increases a risk of abnormal oscillation.

As another related art, Japanese Unexamined Patent Application Publication No. 2005-39975 discloses a current resonant converter.

SUMMARY OF THE INVENTION

The DC-DC converter of the related art prevents a voltage increase under light load by increasing the gain of the photocoupler up to a maximum stable limit. When the DC-DC converter is mass-produced, parts variations among the mass-produced products or temperature changes will trigger the abnormal oscillation. There is an idea of providing the DC-DC converter with a dummy load corresponding to a light load to start a sharp frequency increase, to prevent the abnormal oscillation without increasing the gain of the photocoupler. According to the data of FIG. 4, a dummy load of 0.01% of a rated load will be sufficient. The dummy load, however, causes a large loss and deteriorates efficiency.

The present invention provides a DC-DC converter having a proper regulation and capable of preventing the abnormal oscillation.

According to an aspect of the present invention, the DC-DC converter includes a plurality of switch elements connected in series between both ends of a DC power source, a series circuit of a primary winding of a transformer and a capacitor, connected between a connection point of the plurality of switch elements and an end of the DC power source, a rectifying-smoothing circuit configured to rectify and smooth a voltage generated by a secondary winding of the transformer into a DC voltage, and a controller configured to change a switching frequency of the plurality of switch elements according to a feedback signal generated from the DC voltage and alternately turn on/off the plurality of switch elements. The controller includes a nonlinear response unit configured to nonlinearly change the switching frequency according to a feedback amount represented by the feedback signal.

BRIEF DESCRIPTION OF THE DRAWINGS

FIGS. 3A to 3D are waveforms at the characteristic parts of the DC-DC converter of the related art involving an inter-winding stray capacitance;

DESCRIPTION OF THE PREFERRED EMBODIMENT

DC-DC converters according to embodiments of the present invention will be explained in detail with reference to the drawings.

Embodiment 1

Figure 6:
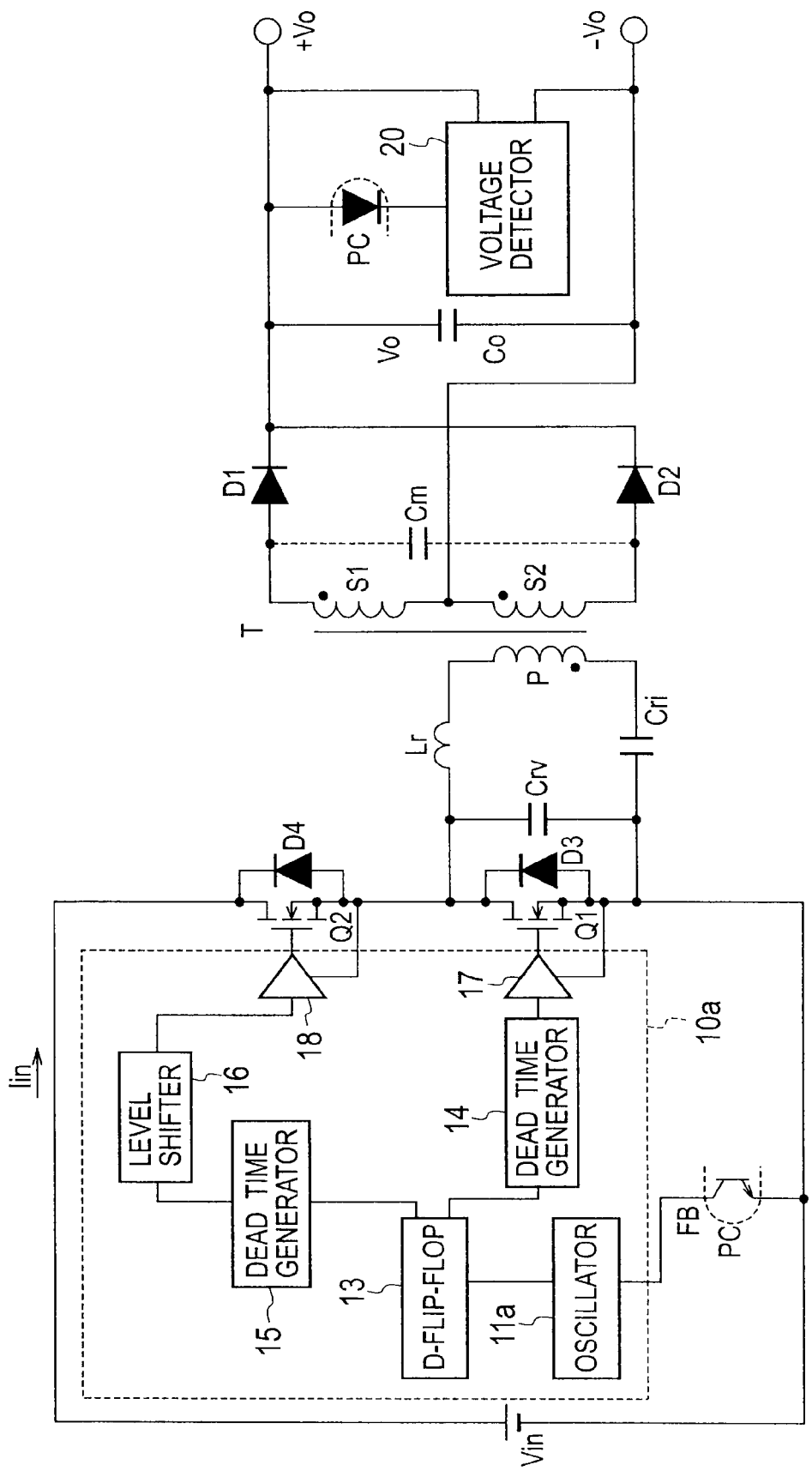
FIG. 6 is a circuit diagram illustrating a DC-DC converter according to Embodiment 1 of the present invention.

FIG. 6 is a circuit diagram illustrating a DC-DC converter according to Embodiment 1 of the present invention. In FIG. 6, both ends of a DC power source Vin are connected to a series circuit including switch elements Q1 and Q2 each of a MOSFET. Connected between drain and source of the switch element Q1 is a diode D3 and connected between drain and source of the switch element Q2 is a diode D4. The diodes D3 and D4 may be parasitic diodes of the switch elements Q1 and Q2. Between the drain and source of the switch element Q1, there are connected a series circuit including a reactor Lr, a primary winding P of a transformer T, and a current resonant capacitor Cri, as well as a voltage resonant capacitor Crv.

Secondary windings S1 and S2 of the transformer T are connected in series. A first end of the secondary winding S1 is connected to an anode of a Diode D1. A first end of the secondary winding S2 is connected to an anode of a diode D2. Cathodes of the diodes D1 and D2 are connected to a first end of a smoothing capacitor Co, an anode of a diode of a photocoupler PC, an output terminal +Vo, and a first end of a voltage detector 20. A second end of the smoothing capacitor Co is connected to a connection point of the secondary windings S1 and S2, an output terminal −Vo, and a second end of the voltage detector 20.

A cathode of the diode of the photocoupler PC is connected to the voltage detector 20, which detects a voltage across the smoothing capacitor Co. The photocoupler PC supplies a feedback current Ifb to a phototransistor, the feedback current Ifb corresponding to a voltage detected by the voltage detector 20.

Based on a value of the feedback current Ifb, a controller 10a controls a switching frequency to turn on/off the switch elements Q1 and Q2. The controller 10a includes an oscillator 11a, which is characteristic to Embodiment 1, a D-flip-flop 13, dead time generators 14 and 15, a level shifter 16, and buffers 17 and 18.

The oscillator 11a corresponds to the nonlinear response unit stipulated in the claims and nonlinearly changes an oscillation frequency (corresponding to the switching frequency of the switch elements Q1 and Q2) based on a feedback amount represented by the feedback current Ifb. Based on an oscillation frequency signal from the oscillator 11a, the D-flip-flop 13 generates first and second pulse signals that alternately rise at a duty factor of 50% each.

The dead time generator 14 delays the first pulse signal by a first dead time and outputs the delayed signal as a gate drive signal through the buffer 17 to the low-side switch element Q1. The dead time generator 15 delays the second pulse signal by a second dead time and outputs the delayed signal as a gate drive signal through the buffer 18 to the high-side switch element Q2.

Figure 1:
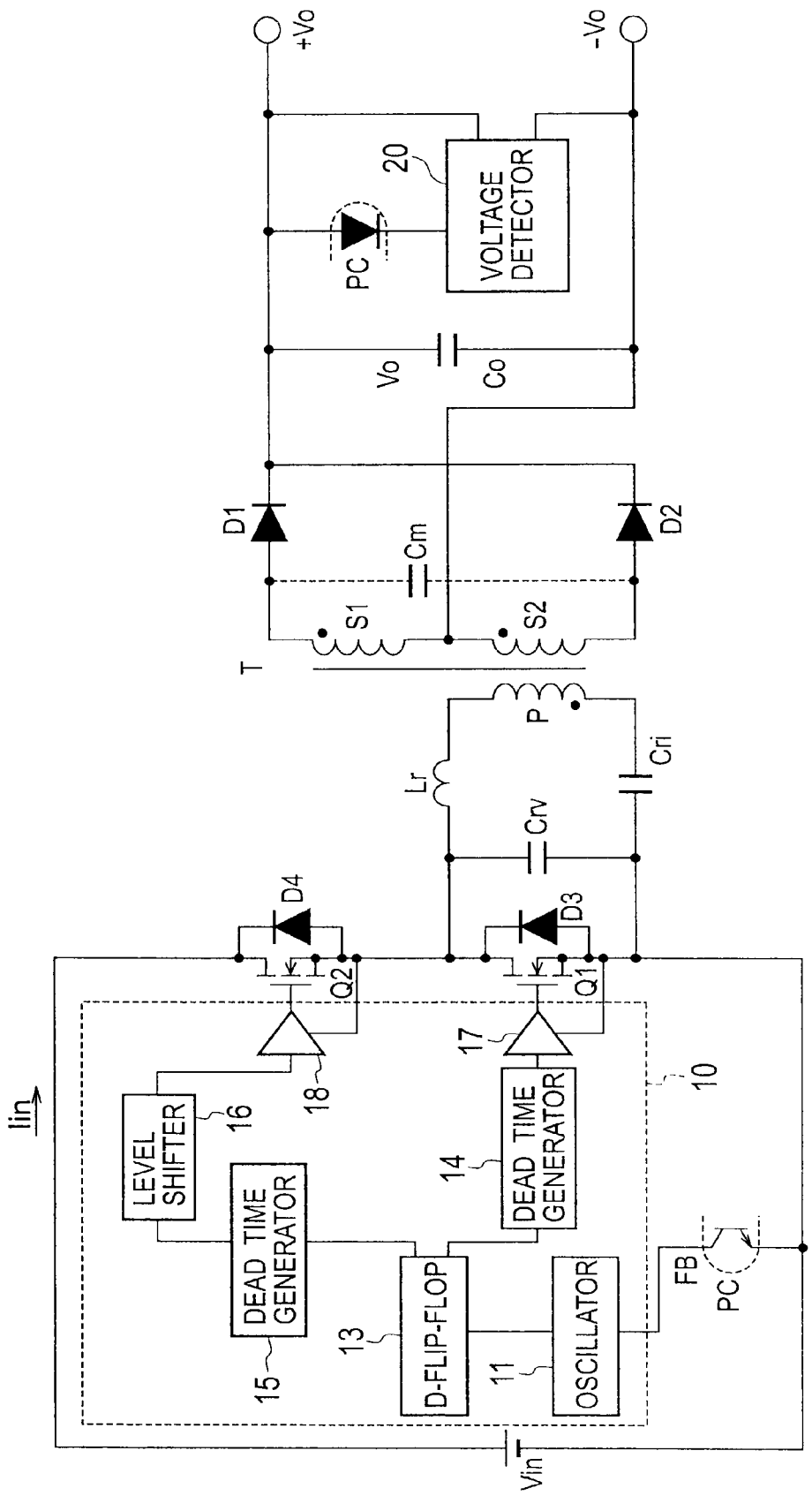
FIG. 1 is a circuit diagram illustrating a DC-DC converter according to a related art.
Figure 2A:
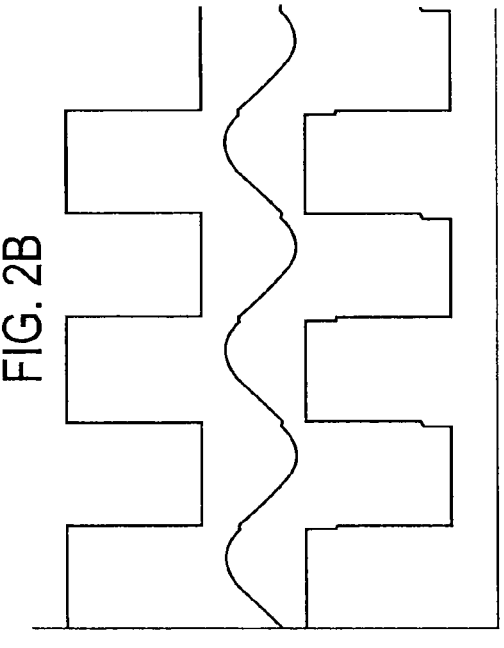
FIGS. 2A to 2D are waveforms at characteristic parts of the DC-DC converter of the related art.
Figure 2B:
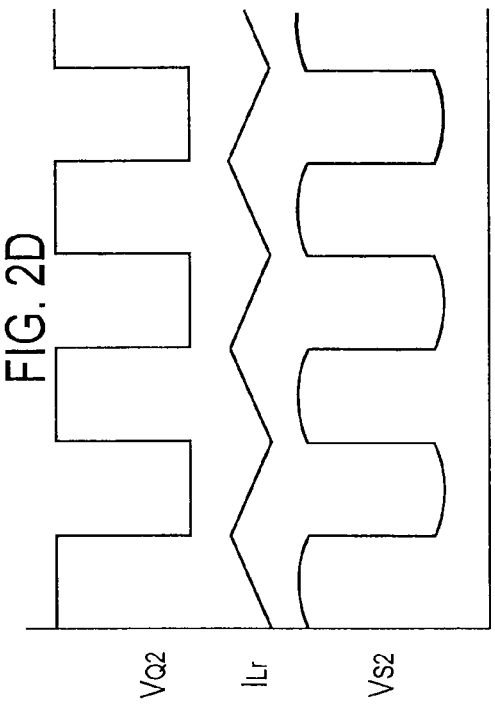
Figure 2C:
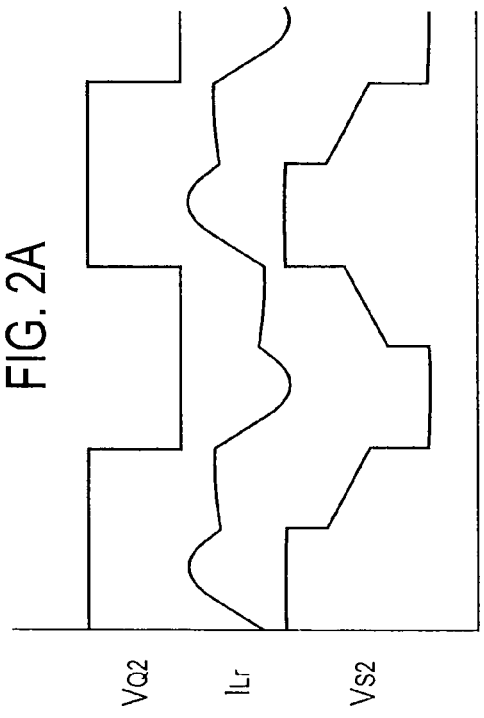
Figure 2D:
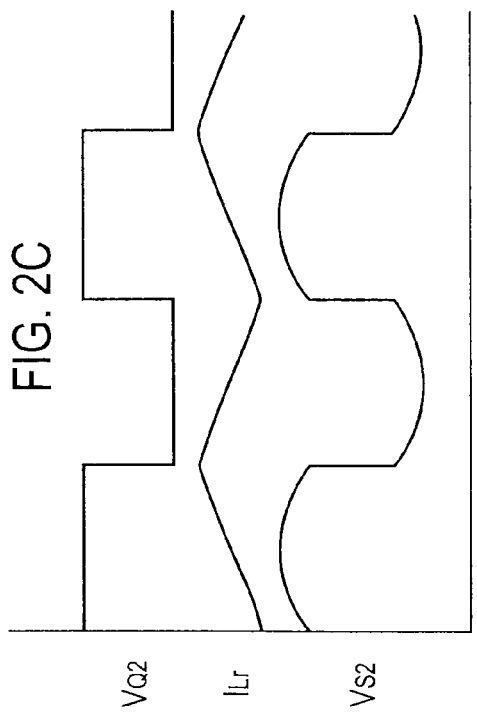
Figure 4:
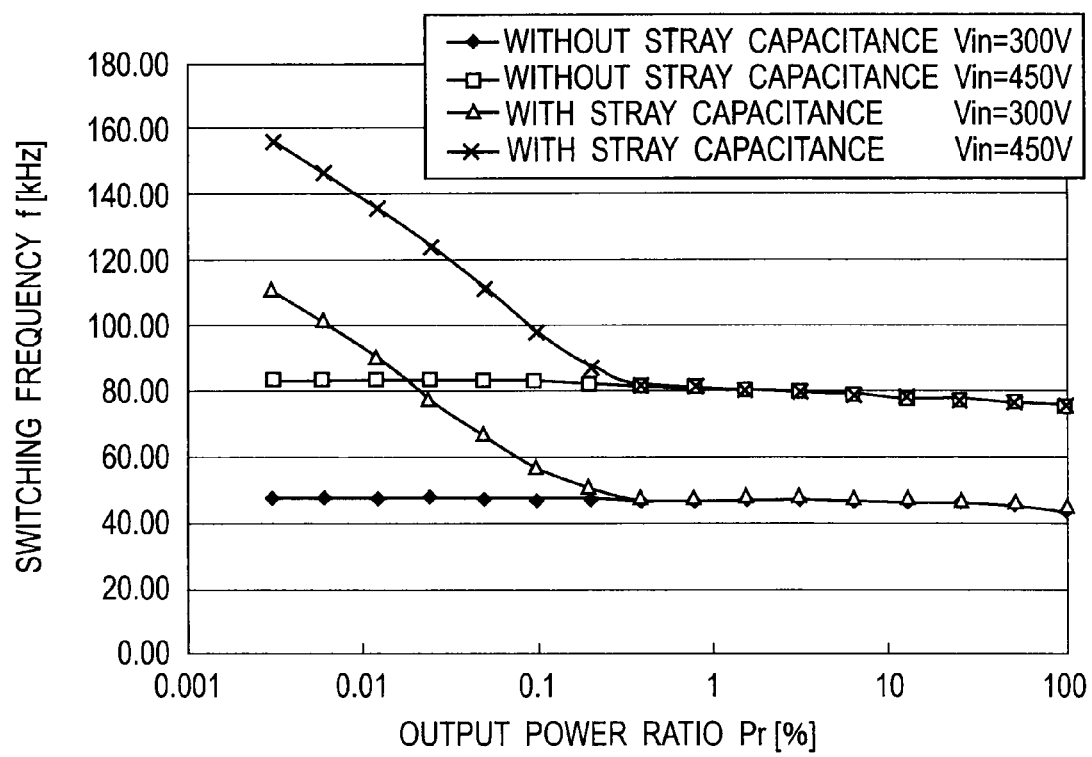
FIG. 4 is a graph illustrating a relationship between an output power ratio and an oscillation frequency of the DC-DC converter of the related art.

Operation of the DC-DC converter according to the present embodiment is substantially the same as that of the DC-DC converter of the related art of FIG. 1, and therefore, operation of the oscillator 11a characteristic to the present embodiment will mainly be explained.

Figure 7:
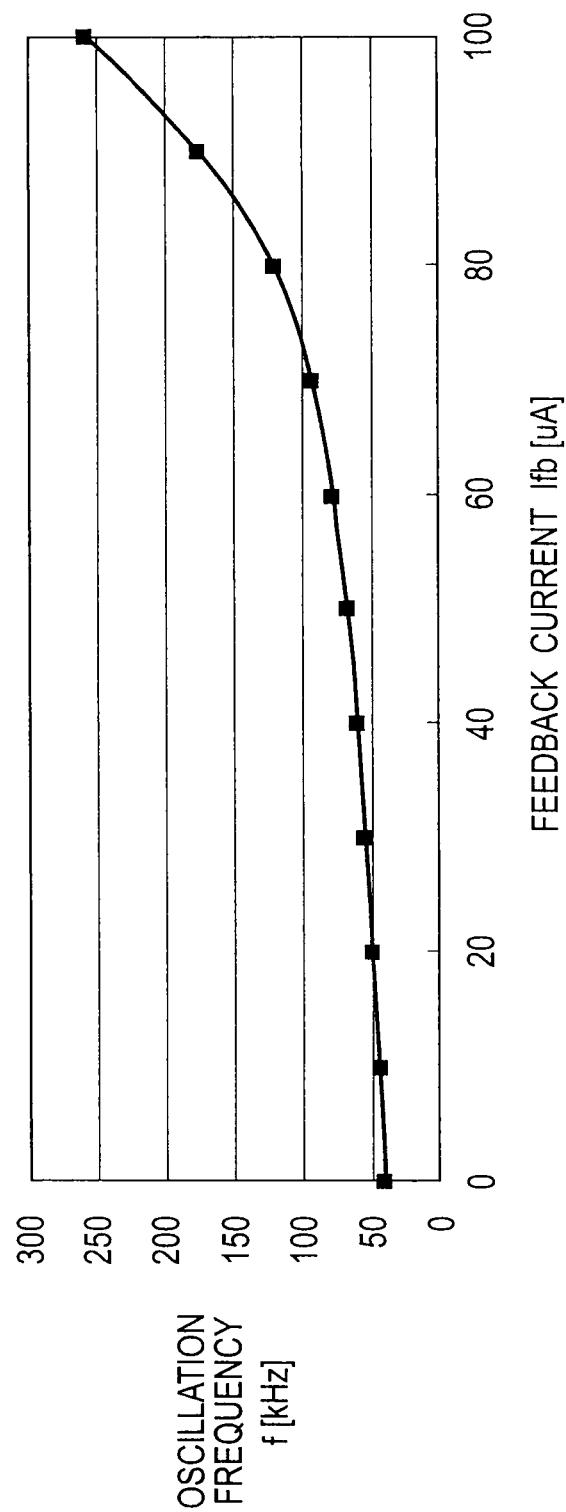
FIG. 7 is a graph illustrating a relationship between a feedback current and an oscillation frequency of a controller in the DC-DC converter of Embodiment 1.

The oscillator 11a is a nonlinear response oscillator to nonlinearly change the oscillation frequency thereof (corresponding to the switching frequency of the switch elements Q1 and Q2) according to a feedback amount represented by the feedback current Ifb. As illustrated in FIG. 7, the oscillator 11a has an exponential characteristic that a change (gradient) to be made in the oscillation frequency according to a feedback amount under light and no load condition (corresponding to the feedback current Ifb of about 70 µA to 100 µA, where 100 µA corresponds to no load condition) is greater than that under heavy load condition (corresponding to the feedback current Ifb of 0 to about 60 µA).

Figure 5:
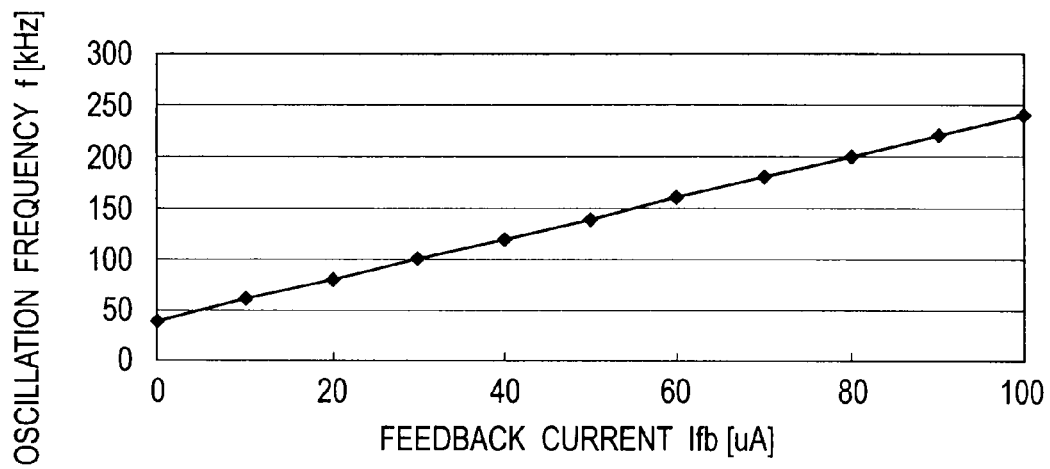
FIG. 5 is a graph illustrating a relationship between a feedback current and an oscillation frequency of a controller in the DC-DC converter of the related art.

Unlike the oscillation frequency of the related art of FIG. 5 that is proportional to the feedback current Ifb, the oscillation frequency of the present embodiment illustrated in FIG. 7 is exponential to the feedback current Ifb. Namely, the oscillator 11a as a nonlinear response unit controls a ratio (f/Ifb) of the switching frequency to the feedback amount in a manner as to be larger under light and no load condition with respect to that under heavy load condition.

With this, there is no need for the present embodiment of increasing the gain of the photocoupler PC to prevent a voltage increase under light load condition. Without increasing the gain, the present embodiment can create a sufficiently large oscillation frequency appropriate for light load from a feedback current of the same level as that of the related art.

Under light to no load in which the oscillation frequency must be increased, the exponential characteristic of the oscillator 11a increases the oscillation frequency, thereby eliminating the need of unnecessarily increasing the gain of the photocoupler PC and the possibility of causing the abnormal oscillation. The DC-DC converter according to the present embodiment is, therefore, mass-producible without causing the abnormal oscillation due to parts variations or temperature changes.

In addition, Embodiment 1 needs no dummy load to prevent a voltage increase under light load condition, and therefore, causes no loss increase or efficiency deterioration. Consequently, the DC-DC converter according to Embodiment 1 secures stable feedback control, proper transient response, and good efficiency.

Embodiment 2

Figure 8:
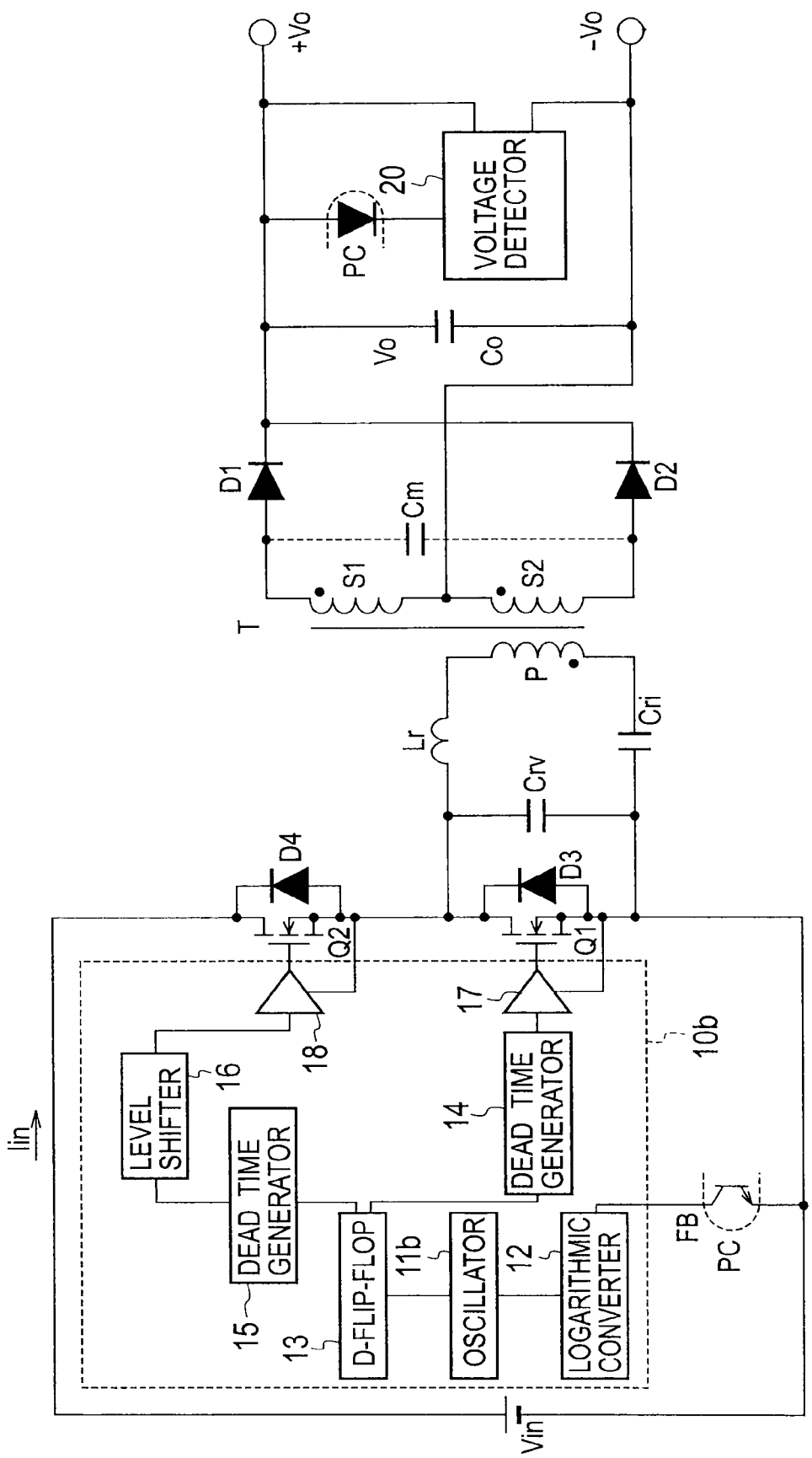
FIG. 8 is a circuit diagram illustrating a DC-DC converter according to Embodiment 2 of the present invention.

FIG. 8 is a circuit diagram illustrating a DC-DC converter according to Embodiment 2 of the present invention. The DC-DC converter of Embodiment 2 employs as the nonlinear response unit an oscillator 11b and a logarithmic converter 12, instead of the oscillator 11a of Embodiment 1. The remaining configuration of Embodiment 2 is the same as that of Embodiment 1, and therefore, the oscillator 11b and logarithmic converter 12 will mainly be explained.

Figure 9:
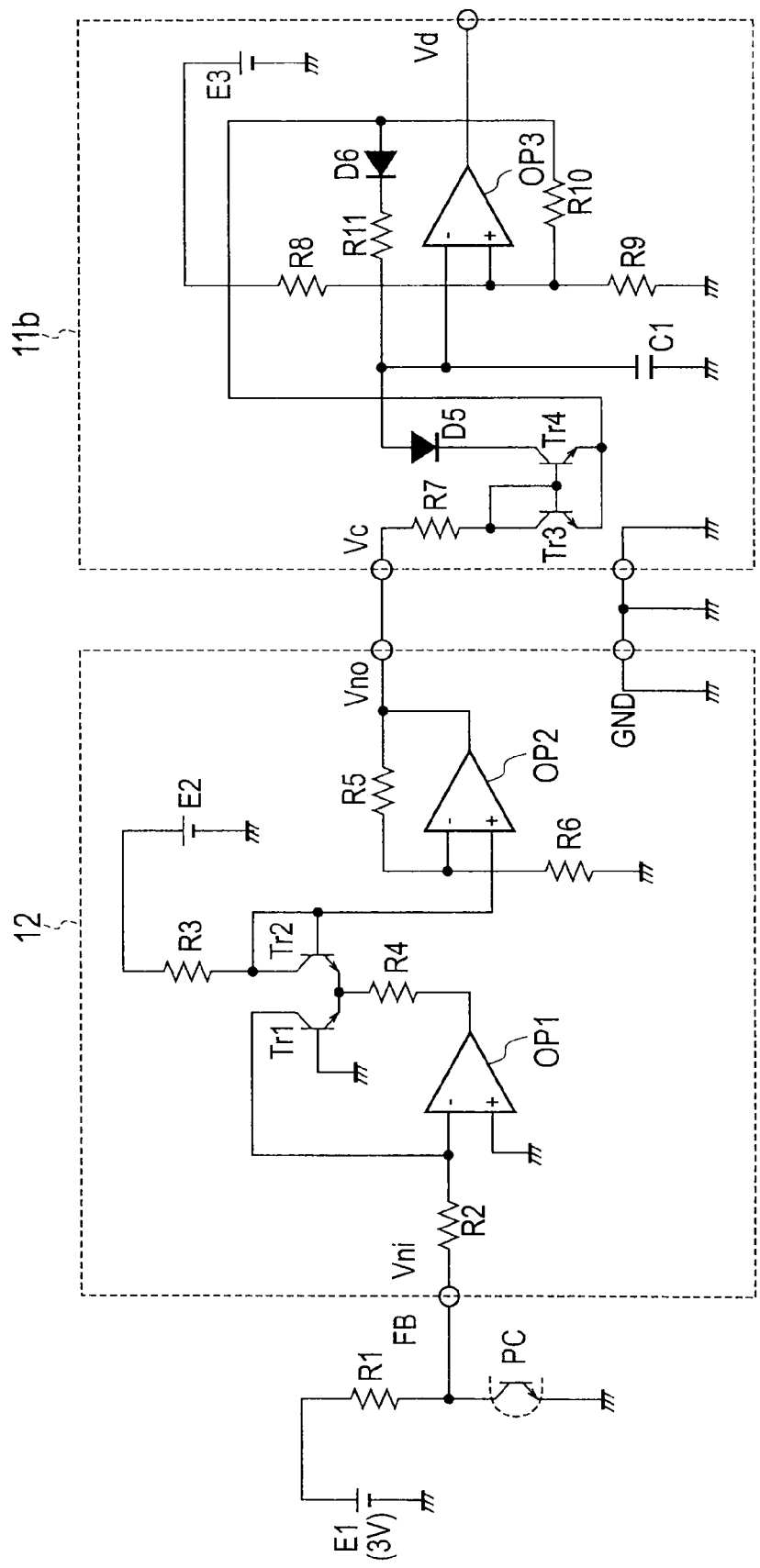
FIG. 9 is a circuit diagram illustrating a logarithmic converter and an oscillator in a controller of the DC-DEC converter of Embodiment 2.

FIG. 9 is a circuit diagram illustrating the logarithmic converter 12 and oscillator 11b contained in a controller 10b of the DC-DC converter according to the present embodiment.

Figure 10:
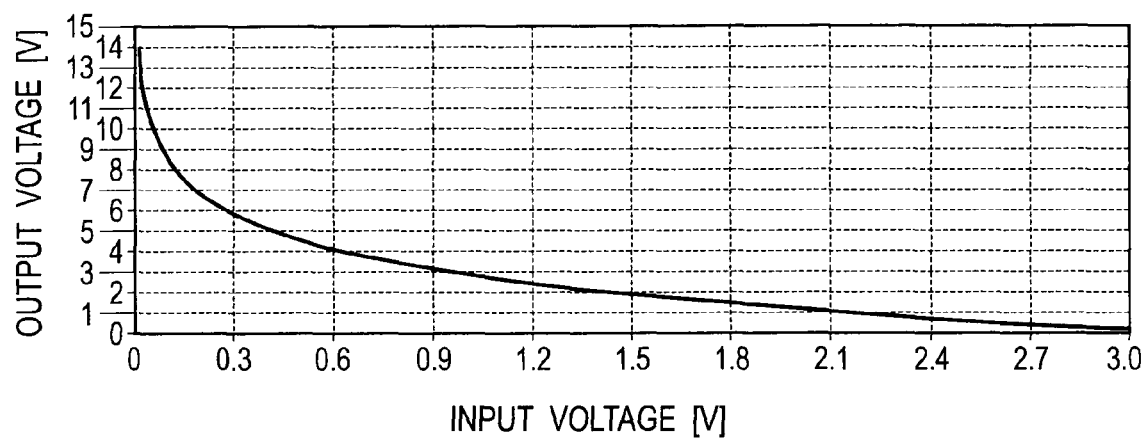
FIG. 10 is a graph illustrating a relationship between an input voltage and an output voltage of the logarithmic converter of FIG. 9.

As illustrated in FIG. 10, the logarithmic converter 12 converts a feedback voltage FB (input voltage) from a photocoupler PC into a logarithmic voltage (a voltage that nonlinearly changes) and outputs the converted voltage as an output voltage to the oscillator 11b. The logarithmic converter 12 has a logarithmic characteristic illustrated in FIG. 10 that makes a change to be made in an output voltage according to a change in an input voltage under light to no load condition (corresponding to the input voltage of about 1.2 V to 0 V in FIG. 10) greater than that under heavy load condition (corresponding to the input voltage of about 1.2 V to 3.0 V in FIG. 10).

In FIG. 9, a terminal FB of the logarithmic converter 12 is connected to a first end of a resistor R1 and a first end of the photocoupler PC. A second end of the resistor R1 is connected to a power source E1. A second end of the photocoupler PC is grounded. The terminal FB is connected through a resistor R2 to an inverting input terminal of an operational amplifier OP1 and a collector of a transistor Tr1. A noninverting input terminal of the operational amplifier OP1 is grounded.

A base of the transistor Tr1 is grounded. An emitter of the transistor Tr1 and an emitter of a transistor Tr2 are connected through a resistor R4 to an output terminal of the operational amplifier OP1. The transistors Tr1 and Tr2 faint a mirror circuit. The operational amplifier OP1, the transistor Tr1 that is a nonlinear element, and the resistor R4 form a logarithmic circuit.

A collector of the transistor Tr2 is connected to a first end of a resistor R3, a base of the transistor Tr2, and a noninverting input terminal of an operational amplifier OP2. A second end of the resistor R3 is connected to a power source E2. An inverting input terminal of the operational amplifier OP2 is connected to a first end of a resistor R5 and a first end of a resistor R6. A second end of the resistor R5 is connected to an output terminal Vno and an output terminal of the operational amplifier OP2. A second end of the resistor R6 is grounded.

With this configuration, the photocoupler PC turns on under light to no load, and therefore, the terminal FB, i.e., a terminal Vni (input voltage terminal) approaches 0 V as illustrated in FIG. 10. As a result, an output from the operational amplifier OP1 becomes high to reduce an emitter current of the transistor Tr2. This increases a voltage at the non-inverting input terminal of the operational amplifier OP2. As a result, the terminal Vno (output voltage terminal) approaches 14 V (Vcc) as illustrated in FIG. 10.

Under heavy load, the photocoupler PC turns off and the terminal FB, i.e., the terminal Vni approaches 3 V as illustrated in FIG. 10. As a result, an output from the operational amplifier becomes low to increase the emitter current of the transistor Tr2. This reduces the voltage at the non-inverting input terminal of the operational amplifier OP2. As a result, the output of the operational amplifier OP2, i.e., the voltage at the terminal Vno approaches 0 V as illustrated in FIG. 10. The logarithmic characteristic illustrated in FIG. 10 is realized with the operational amplifier OP1 and transistor Tr1, to increase a change in the output voltage, i.e., a change in an oscillation frequency under light to no load.

Figure 11:
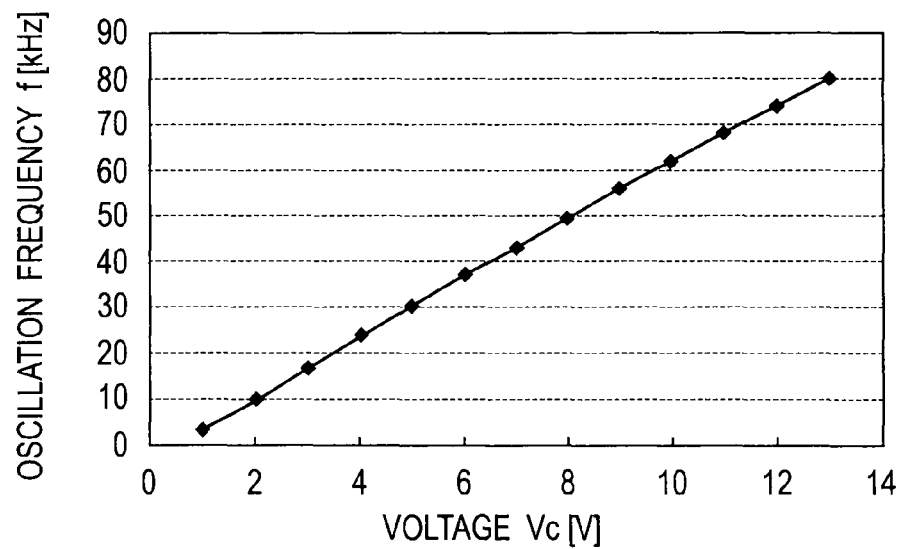
FIG. 11 is a graph illustrating a relationship between a voltage and an oscillation frequency of the oscillator of FIG. 9.

As illustrated in FIG. 11, the oscillator 11b has a characteristic to change the oscillation frequency thereof in direct proportion to the nonlinearly changing voltage provided by the logarithmic converter 12. The oscillator 11b illustrated in FIG. 9 has a terminal Vc connected to the terminal Vno. The terminal Vc is also connected through a resistor R7 to base and collector of a transistor Tr3 and a base of a transistor Tr4. The transistors Tr3 and Tr4 form a mirror circuit.

Emitters of the transistors Tr3 and Tr4 are connected to an anode of a diode D6 and a first end of a resistor R10. A cathode of the diode D6 is connected to a first end of a resistor R11. A second end of the resistor R11 is connected to a first end of a capacitor C1, an anode of a diode D5, and an inverting input terminal of an operational amplifier OP3.

A cathode of the diode D5 is connected to a collector of the transistor Tr4. A second end of the capacitor C1 is grounded. A non-inverting input terminal of the operational amplifier OP3 is connected to a first end of a resistor R8, a first end of a resistor R9, and a second end of the resistor R10. A second end of the resistor R8 is connected to a power source E3. A second end of the resistor R9 is grounded. An output terminal of the operational amplifier OP3 is connected to a terminal Vd.

With this configuration, an output from the operational amplifier OP2 of the logarithmic converter 12 charges/discharges the capacitor C1. A charging current is provided through the constant resistors R8 to R11 and a discharging current is a constant discharging current corresponding to the voltage at the terminal Vc. As a result, the oscillation frequency of the oscillator 11b changes in proportion to the voltage at the terminal Vc, as illustrated in FIG. 11.

With the logarithmic converter 12 and oscillator 11b, a linear change in the feedback voltage FB (input voltage) from the photocoupler PC is converted into a logarithmic change in the oscillation frequency. Like Embodiment 1, Embodiment 2 makes a change to be made in the oscillation frequency according to a feedback amount under light to no load larger than that under heavy load. Namely, Embodiment 2 provides an effect similar to that of Embodiment 1.

In this way, the present invention employs the nonlinear response unit to nonlinearly change a switching frequency according to a feedback amount represented by a feedback signal. Without increasing the gain of the photocoupler, the present invention can create a sufficiently large switching frequency appropriate for light load condition from a feedback current of the same level as that of the related art. Under light to no load condition in which the switching frequency must be increased, the present invention eliminates the need of unnecessarily increasing the gain of the photocoupler, thereby removing the possibility of causing the abnormal oscillation.

The present invention is applicable to switching power source apparatuses.

This application claims benefit of priority under 35USC §119 to Japanese Patent Application No. 2009-127586, filed on May 27, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC-DC converter comprising:
   a plurality of switch elements connected in series between both ends of a DC power source;
   a series circuit of a primary winding of a transformer and a capacitor, connected between a connection point of the plurality of switch elements and an end of the DC power source;
   a rectifying-smoothing circuit configured to rectify and smooth a voltage generated by a secondary winding of the transformer into a DC voltage supplied to a load; and
   a controller configured to change a switching frequency of the plurality of switch elements according to a feedback amount of the DC voltage and alternately turn on/off the plurality of switch elements, wherein
   the controller includes a nonlinear response unit configured to nonlinearly change the switching frequency in response to the feedback amount of the DC voltage so that a change in the switching frequency is greater under a light load condition relative to a same feedback amount under a heavy load condition.

2. The DC-DC converter of claim 1, wherein
   the nonlinear response unit exponentially changes the switching frequency according to the feedback amount of the DC voltage.

3. The DC-DC converter of claim 1, wherein
   the nonlinear response unit is an oscillator in the controller and configured to change the switching frequency according to the feedback amount of the DC voltage in a nonlinear manner.

4. The DC-DC converter of claim 1, wherein the nonlinear response unit includes:
   a nonlinear converter configured to convert a linear feedback amount of the DC voltage into a nonlinear feedback amount of the DC voltage; and
   an oscillator configured to change the switching frequency in direct proportion to the nonlinearly converted feedback amount.

* * * * *